May 10, 1966 C. P. MIDGLEY 3,250,022
APPARATUS FOR DEMONSTRATING LAWS AND PRINCIPLES
OF PHYSICS RELATING TO FLUIDS
Filed July 2, 1965 3 Sheets-Sheet 1

Inventor:
Calvin P. Midgley,
By Hofgren, Brady, Wegner,
Allen, & Stellman, Attys.

United States Patent Office 3,250,022
Patented May 10, 1966

3,250,022
APPARATUS FOR DEMONSTRATING LAWS AND PRINCIPLES OF PHYSICS RELATING TO FLUIDS
Calvin P. Midgley, R.F.D. 1, Lake Villa, Ill.
Filed July 2, 1965, Ser. No. 470,348
25 Claims. (Cl. 35—19)

This application is a continuation-in-part of application Serial No. 78,758, filed December 27, 1960 and application Serial No. 268,216, filed March 25, 1963. Both said applications are now abandoned.

This invention relates to an apparatus for demonstrating laws and principles of physics relating to fluids, and in particular it relates to a teaching aid for use in elementary physics courses.

There is a definite need in the teaching of elementary physics for simple apparatus which may be used by the instructor to perform experiments illustrating the functioning of the various laws of physics.

Apparatus of this type for demonstrating the laws relating to fluids, and particularly the gas laws, has been conspicuously lacking, at least in part due to the difficulty of introducing small amounts of gas to a vessel, or withdrawing small amounts from it, with simple and inexpensive equipment. Likewise, the variety of different physical laws relating to fluids increases the difficulty of devising suitably compact and simple apparatus which may be used in a variety of experiments to illustrate the functioning of all, or even a large part, of those laws.

The present invention provides a very compact and simple apparatus which may be used to demonstrate all the gas laws—Boyle's, Charles', Gay-Lussac's, Avogadro's, Dalton's, and Graham's. In addition, by the use of suitable high-speed photographic apparatus the heat of combustion of two gases may be demonstrated by observing a momentary pressure change in the apparatus at the moment of combustion.

The invention is illustrated in the accompanying drawings, in which.

Figure 1:
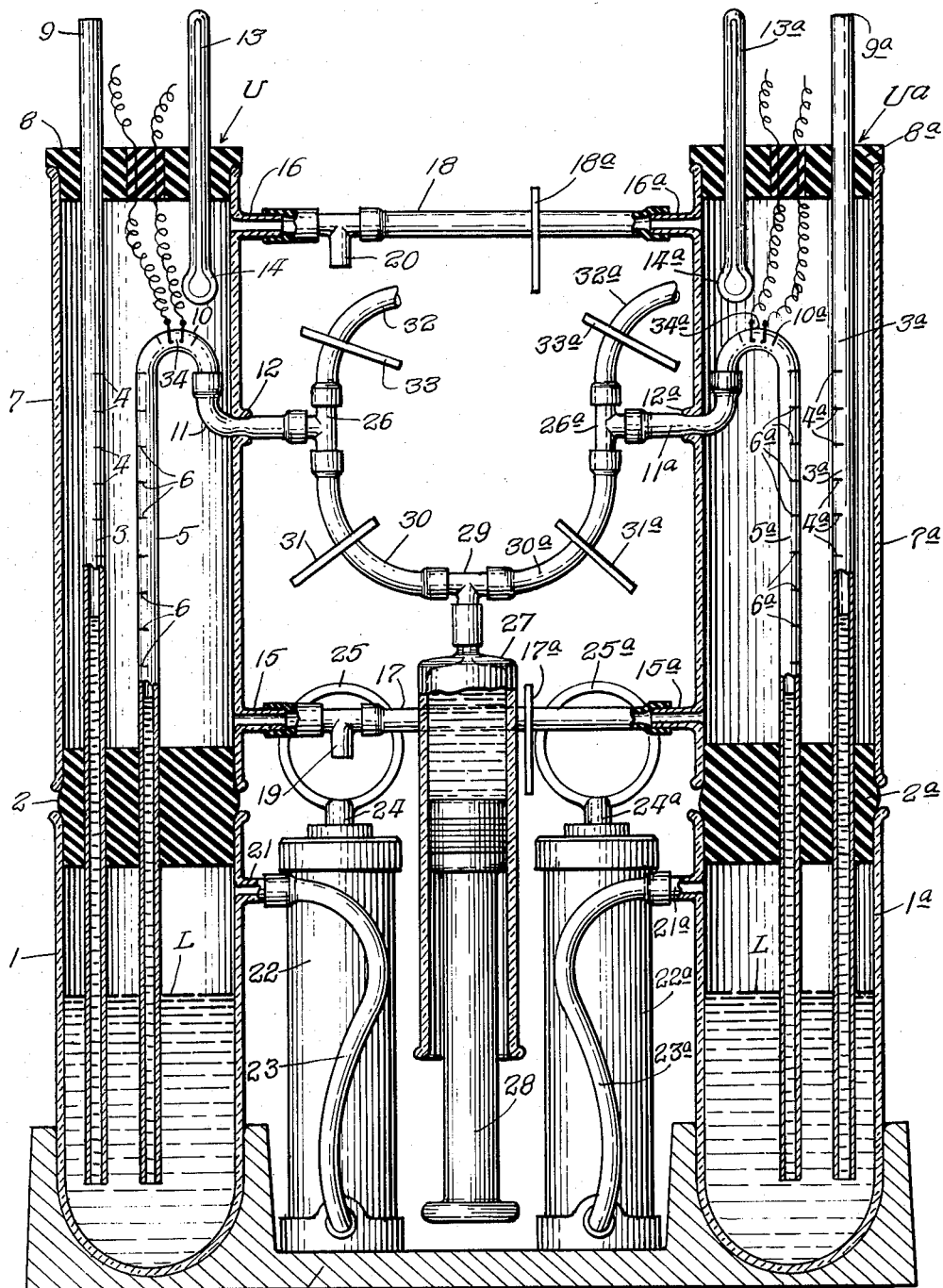
FIGURE 1 is a vertical central sectional view of a first embodiment of the device.

In FIGURE 1 of the drawing, the apparatus has a base B which has suitable recesses to support two identical operating units, indicated generally at U and Ua. Corresponding parts of the two units are correspondingly numbered, with the right hand unit numerals having the reference numeral followed in each case by a letter "a."

Referring now to the left hand unit U, it includes a liquid chamber 1 the upper end of which is sealed by a closure 2 through which extend a first, or pressure tube 3 having calibrations 4, and a second, or gas volume tube 5 which has calibrations 6 for measuring the height of a liquid in the tube 5. Both tubes are seen to have their lower ends immersed in a supply of liquid L which is preferably colored to permit easy observation of the liquid level in the tubes. A transparent jacket 7 has its lower end sealed to the closure 2 and surrounds the tubes 3 and 5, the pressure tube 3 extending upwardly through a hole in a jacket closure 8 and having its upper end 9 open to the ambient atmosphere, while volume tube 5 has a reverse bend 10 at its upper end and has a flexible tube 11 extending outwardly through a hollow boss 12 in the wall of jacket 7. Jacket closure 8 has a hole for a thermometer 13, the bulb 14 of which is within the jacket so that the temperature within the jacket may be observed at all times. In order to control temperature in the jacket, liquid nipples 15 and 16 are formed on the jacket side wall to receive water conduits 17 and 18 respectively, which are also connected to corresponding nipples 15a and 16a of a transparent jacket 7a of right hand unit Ua. The water conduits 17 and 18 are furnished, respectively, with water feed T's 19 and 20 by means of which water may be circulated through both jackets from a common water supply (not shown), the temperature of which is controlled to maintain a constant desired temperature in jackets 7 and 7a. Pinch clamps 17a and 18a for the respective lines 17 and 18 may be used to confine circulation of heated water to jacket 7, in order to demonstrate changes in gas volume with changes in temperature.

To permit changes of air pressure in the space above the liquid L in the chamber 1, the wall of the chamber 1 has a nipple 21, and an auxiliary air supply vessel in the form of a plunger pump 22 is connected by a tube 23 to the nipple and has its piston rod 24 provided with an annular handle 25 for easy manipulation. Preferably pump 22 has an air capacity no greater than is necessary to vary air pressure in the chamber 1 from atmospheric to a predetermined low superatmospheric pressure which will not overflow pressure tube 3. Since the only function of the pump is to supply air to or withdraw it from the chamber, it may be of a very simple valveless type, similar to a hypodermic syringe.

The apparatus as heretofore described permits the introduction of air to each of the chambers 1 or 1a, so as to force liquid L up the tubes 3 and 5 or 3a and 5a. The equipment also permits control of the temperature in the jackets 7 and 7a, by circulating water through the tubes 17 and 18. However, for some types of demonstrations it is also necessary to be able to bleed gas into the upper end of each pressure tubes 5 or 5a, or blend gases in said tubes, or change the volume of gas in each tube by a reverse liquid pressure upon the gas in the tube. For these purposes the apparatus has additional components as follows.

Flexible tube 11 connects with a T-joint 26; and a secondary liquid supply pump 27 having a plunger 28 connects through a T-point 29 with a liquid supply tube 30 to T-joint 26, and with a liquid supply tube 30a to a similar T-joint 26a on flexible tube 11a of the right hand unit. The T-joint 29, together with tubes 30 and 30a, forms a Y-tube providing an interconnection between the volume tubes 5 and 5a. Passage of liquid from supply pump 27 into the T-joints 26 and 26a is controlled by pinch clamps numbered 31 and 31a, respectively. By forcing liquid from supply pump 27 into tube 30 or 30a (or both) with pinch clamps 31 and 31a loose, the gas level can be raised to control points 34 or 34a in the pressure tubes 5 and 5a, to confine the gas to that portion of each system which is within the transparent temperature control jacket.

In order to bleed gas from lines 11 and 11a, or introduce a second gas into said lines, T-joints 26 and 26a also connect, respectively, with flexible tubes 32 and 32a, controlled by pinch clamps 33 and 33a; said tubes providing spaced gas ports for the Y-tube through which gas may be introduced to the Y-tube from an independent gas supply (not shown) for certain types of demonstration.

Finally, in order to permit very small quantities of combustible mixtures of gases to be ignited in the tubes 5–11 or 5a–11a, spaced electrodes 34 and 34a are provided, respectively, in reverse bends 10 and 10a, and connected to a source of electric energy, in order to discharge a spark across the electrodes and ignite the mixture in either tube.

Use of the apparatus to demonstrate various laws and principles of physics, and to establish various desired conditions, will now be described.

(1) Boyle's law states: "The volume of a confined body of gas varies inversely as the absolute pressure, provided the temperature remains unchanged." The greater the pressure on the gas the smaller the volume of the gas. Starting with the same pressure in both units as shown by the identical height of liquid in pressure tubes 3 and 3a, and using the liquid supply pump 27 to confine the gas in the volume tubes 5 and 5a to the control points 34 and 34a; the air supply pump 22a is then used to increase the pressure in chamber 1a while leaving the pressure unchanged in chamber 1, so the latter serves as a control; and it is thereby shown that as liquid rises in pressure tube 3a the volume of gas in volume tube 5a is reduced. The calibrations 3 and 3a of the pressure tube show the amount of the pressure difference between the chambers 1 and 1a, and the calibrations 6 and 6a of the volume tubes show that the difference in volume in tubes 5 and 5a is inversely proportional to the difference in pressure.

(2) Charles' law states: "At constant pressure the volume of a fixed mass of gas varies directly with the absolute temperature." Absolute zero is −273° C.; so any absolute temperature is the centigrade temperature plus 273°. By leaving chamber 7a at room temperature to serve as a control, closing pinch clamps 17a and 18a to isolate that chamber from the temperature control circuit, and pumping either heated or cooled water through the chamber 7, it may be shown that as the temperature in chamber 7 falls or rises, the volume of gas in volume tube 5 increases or decreases as shown by the change in the level of the liquid L in the tube. By proper selection of the calibration for the tubes 5 and 5a, it can be shown that this change in volume of the gas is in fact equal to $\frac{1}{273}$ of its volume at 0° C.

(3) The interrelationship between the operation of Boyle's law and Charles' law may be demonstrated by using both the techniques described in (1) and (2) above.

(4) Gay-Lussac's law states that "gases combine in the ratio of small whole numbers." One volume of a particular gas "A" combines with an equal volume of a gas "B"; while it may combine with two volumes of a different gas "C"; or with three volumes of a gas "D." This may be demonstrated with a mixture of combustible gases by first opening the pinch clamps 33 and 33a, utilizing the air supply pumps 22 and 22a and liquid supply pump 27 to drive all gas from both of the volume tubes, and then through the tubes 32 and 32a introducing a specific volume of gas "A" into the volume tube 5 and a specific volume of gas "B" into the volume tube 5a. The gases may then be permitted to mix in the Y-tube by opening the pinch clamps 31 and 31a and withdrawing liquid into supply pump 28 until the liquid level is at the bottom of the T-joint 29. Increasing pressure in the chamber 1a may then be used to force all the mixed gas past the T-joint 29 into connecting tube 30, after which the pinch clamp 31a may be closed and the liquid pump 27 operated to force the entire mixture of gases into the volume tube 5, tube 11, and T-joint 26. An electric spark discharge across the points 34 will cause the gases to explode and combine. If the original ratios of gases in the mixture were precisely accurate—which need not be the case for this particular demonstration—there will be no gas left in the tube. Any gas left will be only that amount of one gas which was in excess of the small whole number ratio in which the gases combine; and this can be measured in the volume tube 5.

(5) Avogadro's law states: "At the same temperature and pressure, equal volumes of different gases contain equal numbers of molecules. Equal volumes of gases at the same temperature and pressure may be introduced into the volume tubes 5 and 5a as described in (4) above. An explanation of the operation of Gay-Lussac's law then shows the students why Avogadro's law is correct. The gases are made up of atoms, and any given quantity of a gas consists of a definite number of molecules or atoms. The gas volumes combine in the ratio of small whole numbers, so they must obviously combine atom for atom. If the gas volumes are very accurately measured in the two tubes, they should combine without leaving any excess provided they are gases which combine in a 1-to-1 ratio.

(6) Dalton's law states: "A mixture of several gases which do not react chemically exerts a pressure equal to the sum of the pressures which the several gases would exert separately if each were allowed to occupy the entire space alone at a given temperature." By collecting in volume tube 5 10 cm. of gas at a pressure of 15 cm. of water, and in volume tube 5a 10 cm. of gas at 20 cm. of water, and then combining the gases in one of the two tubes by the technique described in (4) above, it may be demonstrated that when the mixture is confined to the original 10 cm. volume the pressure is 20+15=35 cm. of water.

(7) Graham's law states: "At equal temperature and pressure, gases diffuse at a rate which is inversely proportional to the square root of their densities." This law may be demonstrated by collecting equal volumues of two gases of different density at equal temperatures and pressures in the volume tubes 5 and 5a. By careful manipulation of liquid supply pump 27 the gases may be made to mix in the bottom of the Y-tube, in and immediately adjacent the T-joint 29. Assume that originally the less dense gas was in the volume tube 5, and the more dense gas in the volume tube 5a. When the gases mix—i.e., diffuse into one another—the volume tube 5 will show an immediate pressure drop, while the tube 5a shows a pressure rise. By mathematical computation, or a suitable conversion table, it can be shown that the rise in 5 and the fall in 5a are inversely proportional to the square roots of the densities of the gases. In order to enhance the visual effectiveness of the demonstration of Graham's law, a semi-permeable membrane may be interposed in tube 30, or tube 30a, between the two gases, so that a more definite pressure drop will be produced when the gases diffuse into one another.

(8) If the volume tubes 5 and 5a are properly calibrated, Charles' law may be used as the basis for measuring the temperature in each water jacket by observing the volume occupied by the gas at a given pressure.

(9) The heat of combustion of two gases may be demonstrated by noting the instantaneous pressure change as a mixture of gases is ignited as described in (4) above. While this is probably too quick for visual observation, a high speed camera triggered by the spark discharge which ignites the gases should make it possible to photograph the pressure reading at the instant of change. Since the pressure varies with temperature, the pressure change illustrates the temperature change within the pressure tube.

(10) By filling the chambers 1 and 1a with liquids of two different densities, the difference in density may be graphically illustrated by measuring the difference in the heights of the columns of liquid in the pressure tubes 3 and 3a when the pressures in the two chambers are increased by operation of the air supply pumps 22 and 22a. For this purpose it is desirable to connect the annular pump handles 25 and 25a by an equalizing mechanism which assures that they both move the same distance and thus add the same volume of air to the respective chambers.

Figure 2:
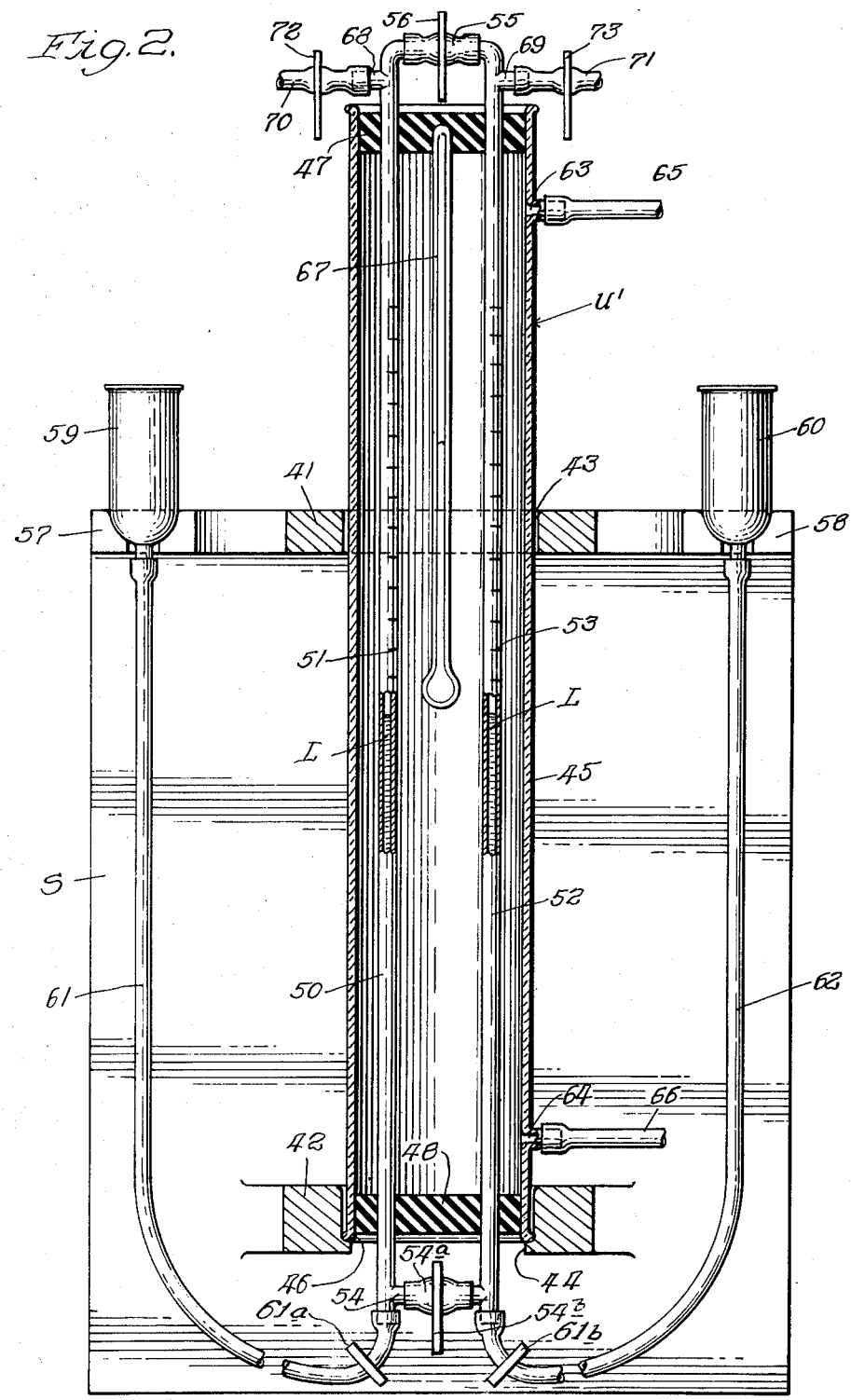
FIGURE 2 is a vertical central sectional view of a second embodiment of the device.

Referring now to FIGURE 2, a second embodiment of the device is shown, which is similar to the embodiment shown in FIGURE 1, and which functions in substantially the same manner. However, as will hereinafter become apparent the second embodiment, indicated generally at U' in FIGURE 2, is somewhat simpler in design and requires fewer component parts to produce the desired results. Unit U' is equivalent to the unit U or the unit Ua in FIGURE 1; and two units like U' could be cross connected like the units U and Ua to permit performance of all the demonstrations possible with the apparatus of FIGURE 1.

Unit U' is preferably mounted in a suitable stand S having spaced brackets, or rests 41 and 42 with centrally disposed openings 43 and 44, respectively. Unit U' includes a transparent tubular water jacket 45 which is seated upon a shoulder 46 in opening 44, and which extends upwardly from stand S through opening 43. The upper and lower ends of water jacket 45 are sealed by closures 47 and 48, respectively, through which extend first and second tubes 50 and 52 having calibrations 51 and 53, respectively. The lower ends of tubes 50 and 52 are cross connected at 54, there being a flexible section 54a and a clamp 54b for segregating the tubes, and the upper ends of the tubes 50 and 52 are connected by a flexible tube 55 which may be closed by a clamp 56.

Stand S further includes apertured brackets 57 and 58, which are adapted to support filler cups 59 and 60, respectively. Transparent flexible tubes 61 and 62, which are shown broken, are long enough to permit the filler cups to be raised above the rest 41, or lowered, connect the lower ends of filler cups 59 and 60 with the lower ends of tubes 50 and 52, respectively; and the cups sit loosely in the apertured brackets 57 and 58 so they may be manually raised or lowered. A suitable liquid, such as mercury, is poured into the apparatus through filler cups 59 and 60 and flows through tubes 61 and 62 into tubes 50 and 52. The level of the liquid L within tubes 50 and 52 may be noted by an observation of the appropriate calibration 51 or 53, and may be varied by raising or lowering the filler cups 59 or 60. Once the desired quantity of liquid has been poured into the apparatus, the volume thereof is fixed and does not need to be supplemented or diminished for the performance of the various demonstrations referred to hereinafter. In order to control temperature in jacket 45, liquid nipples 63 and 64 are formed on the jacket side wall adjacent the upper and lower ends, respectively, and are connected to a source of water, not shown, through conduits 65 and 66. A thermometer 67 is mounted in jacket closure 47, so that the temperature in the jacket may be observed. Clamps 61a and 61b selectively close tubes 61 and 62 respectively, to provide means for isolating tubes 50 and 52 from their respective reservoirs 59 and 60.

The upper end of tube 50 is provided with a transverse tubular stub 68 connected to a flexible tube 70 that may be selectively closed by pinch clamp 72; and similarly the upper end of tube 52 is provided with a transverse tubular stub 69 connected to a flexible tube 71 that may be selectively closed by a pinch clamp 73. By the provision of these means, the upper ends of tubes 50 and 52 may either be closed, cross connected through 55, or exposed to the ambient atmosphere.

While the use of the apparatus will probably be apparent from the description of the use of the embodiment set forth in FIGURE 1, several examples will nevertheless be given to clarify understanding.

When demonstrating Boyle's law, clamp 56 is engaged to divide tubes 50 and 52 into two separate chambers. The level of the mercury in tubes 50 and 52 will, of course, be level. Clamp 72 is then disengaged from tube 70 to expose the mercury within tube 50 to the ambient atmosphere. Clamp 73 is clamped onto tube 71 to trap a column of air in the upper portion of tube 52. It should be understood, of course, that either clamp 72 or 73 could be used and that clamp 73 has been selected merely for purposes of illustration. By removing either filler cup 59 or 60 from bracket 57 or 58, and raising it with respect to the stand, the level of the mercury within tubes 50 and 52 will rise. The pressure in tube 50, of course, remains constant; while the pressure on the air in tube 52 increases as the mercury rises in the tube. The pressure increase, and the corresponding volume decrease of the air in tube 52 may be observed by comparison of the calibrations 51 and 53.

When demonstrating Charles' law, a column of air is trapped in the upper portion of tubes 50 and 52 by closing clamps 56, 72 and 73. A constant temperature source of water, which is either above or below room temperature, is then circulated through jacket 45 through nipples 63 and 64. The change in gas volume is then noted by observation of the change in mercury level within the tubes 50 and 52.

When demonstrating laws such as Gay-Lussac's, Avogadro's, or Dalton's, with the clamps 72 and 73 removed, and clamp 56 in place, the cup 59 or 60 is raised sufficiently to elevate the mercury in tubes 50 and 52 until all air is driven from said tubes. A measured volume of gas A is then introduced into the upper portion of tube 50 through tube 70, and a measured volume of gas B is introduced into the upper portion of tube 52 through tube 71, with the mercury being permitted to fall as the gas enters. Clamps 72 and 73 are then engaged to close the upper portions of the tubes. Any desired mixing of the gases is accomplished by merely removing clamp 56 and allowing the gases to diffuse into one another.

Figure 3:
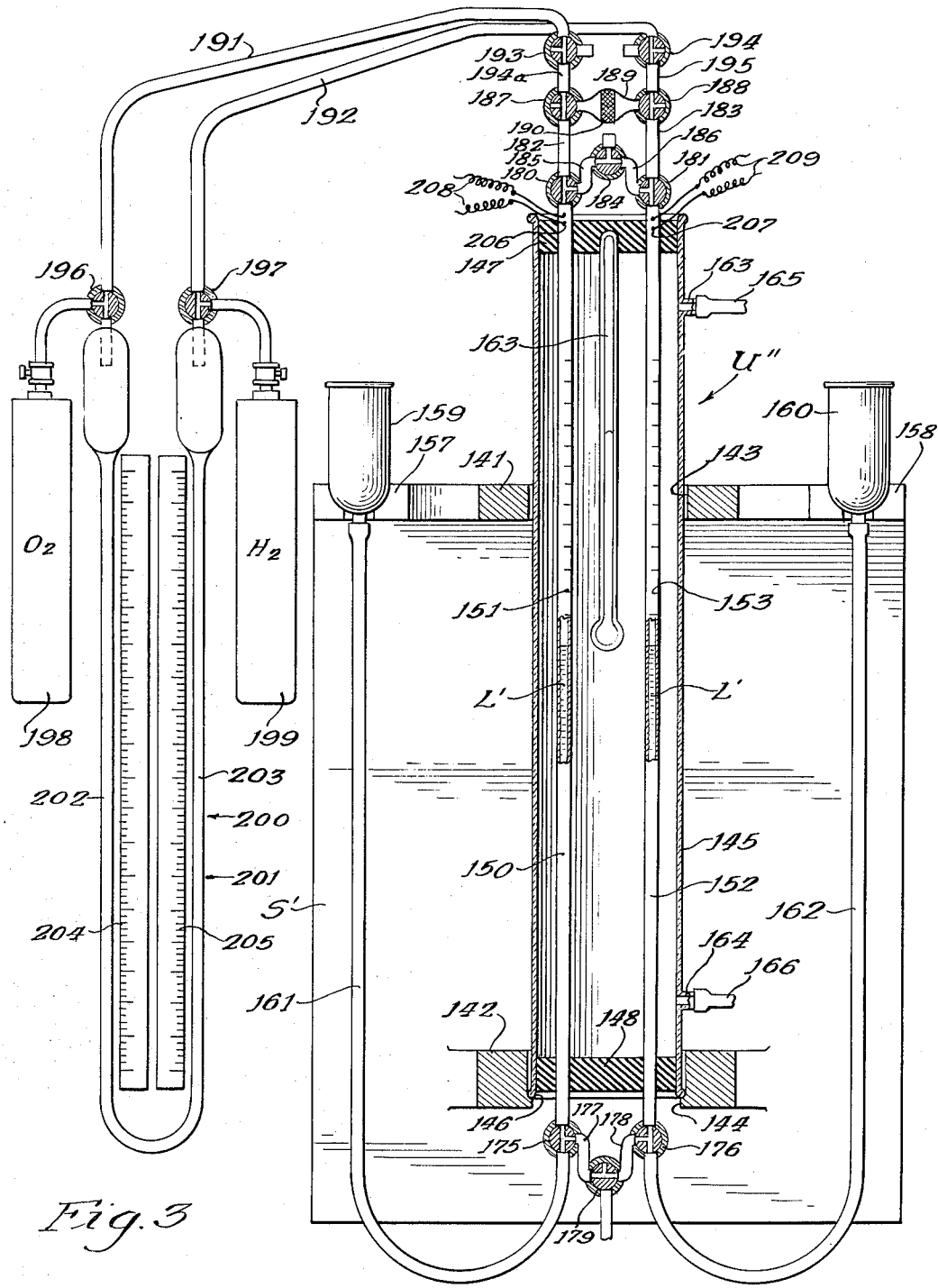
FIGURE 3 is a vertical central sectional view of a modification of the embodiment shown in FIGURE 2.

Referring now to FIGURE 3, a modified form of the apparatus shown in FIGURE 2 is illustrated, and similar reference numerals have been used to indicate corresponding elements, and have been increased by the sum 100. The unit U'' of FIGURE 3 is mounted on a stand S' similar to that shown in FIGURE 2, and includes a water jacket 145 with first and second tubes 150 and 152 therein. A filler cup 159 is connected to tube 150 by a flexible tube 161, and likewise a filler cup 160 is connected to tube 152 by a flexible tube 162. A three-way valve 175 is connected between tubes 150 and 161 to control the flow of liquid L' therethrough, and a similar three-way valve 176 is connected between tubes 152 and 162 for the same purpose. Tubes 177 and 178 are connected with valves 175 and 176, respectively, and a three-way valve 179 is positioned between tubes 177 and 178, for selectively cross-connecting or segregating the liquid supplies in lines 161 and 162 and in tubes 150 and 152, when desired.

At the upper end of the water jacket 145, three-way valves 180 and 181 connect tubes 150 and 152 respectively with further tubes 182 and 183. Means are provided for cross-connecting the upper ends of tubes 150 and 152 and include a further three-way valve 184 connected between valves 180 and 181 by tubes 185 and 186.

Further means are provided for cross-connecting the tubes 150 and 152 and include three-way valves 187 and 188 connected with tubes 182 and 183 respectively and having a cross tube 189 extending therebetween. A suitable semi-permeable substance 190, such as gypsum or the like, is provided in tube 189.

Means are provided for introducing different gases into the tubes 150 and 152, and includes tubes 191 and 192 connected by three-way valves 193 and 194 to valves 187 and 188, respectively, by tubes 194a and 195. Independent supplies of gas are connected to tubes 191 and 192 by three-way valves 196 and 197, and in the illustrated embodiment, oxygen and hydrogen are provided by pressurized containers 198 and 199 connected to valves 196 and 197.

Means are provided for measuring the gas pressures, and include a water manometer 200 consisting of a U-shaped tube 201 having its spaced legs 202 and 203 connected to valves 196 and 197, respectively. Any suitable liquid, such as colored water or alcohol, may be provided in the tube 200, and suitable calibrated members 204 and 205 are provided adjacent legs 202 and 203 respectively for measuring changes in the liquid level. The water manometer is not essential, but is very useful in demonstrating Graham's law, because the pressure changes and differentials are too small to be readily observed on a mercury manometer.

Means for igniting combustible mixtures of gases are provided in tubes 150 and 152 and include spaced electrodes 206 and 207 connected to a suitable source of electrical energy, not shown, by wires 208 and 209 for causing a spark in the tubes 150 and 152.

It is believed that the operation of the embodiment illustrated in FIGURE 3 will be apparent from the description of the embodiments shown in FIGURE 2; however, the demonstration of Gay-Lussac's law and Graham's law will be described to facilitate understanding of the apparatus.

Valves 175 and 176 are first adjusted to close tubes 177 and 178, respectively, and to establish communication between tubes 150 and 161, and between tubes 152 and 162. Valve 179 is adjusted to close both tubes 177 and 178. Valves 196 and 197 are then adjusted to place the oxygen and hydrogen supplies in communication with tubes 191 and 192, respectively, and to close off their connection with the water manometer 200. Valves 187, 188, 193 and 194 are adjusted to the position shown in FIGURE 3. Valves 180 and 181 are adjusted so as to establish communication between tubes 150 and 182, and 152 and 183 respectively; and to prevent communication through the tubes 185 and 186.

Valve 184 is then opened to tube 150 and the ambient atmosphere, and filler cup 159 is raised until the tube 150 is completely filled with mercury, at which time valve 180 is turned in a counterclockwise direction to establish communication between tubes 182 and 185, and to block tube 150. Oxygen is then introduced through valve 196 to wash out the contained air in tube 191 up to valve 184. Valve 184 is then closed to each of the tubes in communication therewith, valve 180 is opened to 150, and oxygen is further introduced into tube 150 by slowly lowering filler cup 159 at the same time maintaining a slight pressure. When tube 150 is nearly full, valve 193 is rotated in a clockwise direction to place the same in communication with the ambient atmosphere and with tube 191, but to block tube 150. The oxygen source is then shut off. Tube 150 is now filled to its mercury level with oxygen, as are all the communicating channels from valve 193. Tube 152 is then filled with hydrogen in the same way that tube 150 has been filled with oxygen by manipulating the appropriate valves.

Valve 193 is then opened to ambient atmosphere and to tube 150, and the mercury is caused to ascend to somewhere in the lower third of the tube 150 with the meniscus in tube 161 equal to the meniscus in tube 150, at which time valve 193 is closed to all of the tubes communicating therewith. Valve 194 is then opened to tube 152 and ambient atmosphere, and the mercury in tube 152 is allowed to ascend to somewhere in the middle of tube 152 where it is leveled off at atmospheric pressure with the mercury level in tube 162 at the same height. The valve 194 is then closed to all of the tubes communicating therewith. Valve 180 is then rotated to close off tube 182 and to place tubes 150 and 185 in communication with one another. Likewise, valve 181 is rotated to close off tube 183 and to place tubes 186 and 152 in communication with one another. A quantity of oxygen is then transferred from tube 150 to tube 152 by manipulating filler cup 159 and valve 184. Valve 184 is now closed to all its channels, isolating 152. The mixture of gases in 152 is placed at atmospheric pressure and the volume noted. The oxygen transferred is the difference between this new volume and the original volume in 152. This is recorded. Filler cup 160 is then raised to place the contained mixture of hydrogen and oxygen at slightly more than atmospheric pressure. The gaseous mixture is then exploded by means of electrodes 207. The mercury will suddenly rise in tube 152. The filler cup 160 is then adjusted until the remaining gas is at atmospheric pressure. Knowing the amounts of hydrogen and oxygen used, the demonstration confirms Gay-Lussac's law of the small whole number proportions by which gases combine.

In demonstrating Graham's law, oxygen and hydrogen are introduced into tubes 150 and 152 as in the demonstration of Gay-Lussac's law. Tubes 150 and 152 are then put under atmospheric pressure by placing the level of mercury in cup 159 and tube 161 coplanar with the meniscus in tube 150, and the level of mercury in cup 160 and tube 162 coplanar with the meniscus in tube 152. Valve 196 is then adjusted to place the leg 202 of the water manometer in communication with the tube 191, and to close off the oxygen supply source. Valve 197 is then opened to the leg 203 of the water manometer, and to place the same in communication with tube 192 and to block off the hydrogen source. With the manometer 200 at rest, valves 187 and 188 are opened to all three of their related tubes, and the time at which this is done is recorded. A graph is then plotted of the increases or decreases in pressure against time, and it will be noted quantatively that pressure will rise in the oxygen side of the apparatus and fall in the hydrogen side, as hydrogen diffuses into the oxygen more rapidly than the reverse takes place. After approximately one hour's time, the valves 180 and 181 are adjusted to block off tubes 182 and 183 respectively, and to place tubes 185 and 186 in communication with one another. The gaseous mixture is then exploded, as in the demonstration of Gay-Lussac's law, and the amount of hydrogen transferred to tube 150 will be seen to be greater than the amount of oxygen transferred to tube 152 inversely as the square roots of their densities. The increase in pressure in tube 150 with the resulting volume change, as well as the decrease in pressure in tube 152 with the volume change can serve as the exact measure of the difference in the amounts of gas transferred from one side to the other by applying the principles of Boyle's and Dalton's laws.

Another use for the apparatus of FIGURE 3 is to demonstrate or test the permeability of various materials to various types of gases. As an example, Saran is not permeable to oxygen but is to nitrogen. This fact can be proved by substituting a Saran sheet for the usual semipermeable substance 190 in the cross tube 189; and successively admitting the two gases to one side of the tube 189. Nitrogen will produce a pressure increase in the indicator tube on the opposite side of the Saran sheet, while oxygen will not.

From the foregoing description of the apparatus and of the demonstrations which may be made with it, it is apparent that the present invention provides a simple but very versatile item of laboratory equipment for use as a teaching aid in elementary physics courses.

The foregoing detailed description is given for clearness of understanding only and no unnecessary limitations are to be understood therefrom, as some modifications will be obvious to those skilled in the art.

I claim:

1. Apparatus for demonstrating laws and principles of physics relating to fluids, comprising: a chamber partially filled with liquid; a first tube which has its lower end immersed in said liquid, said first tube having its upper end open to the ambient atmosphere; a second tube which has its lower end immersed in said liquid, the upper end of said second tube being a substantial distance below that of the first tube; means for selectively sealing the upper end of said second tube so that it may be completely filled with liquid by increasing the air pressure in the chamber and may then be sealed; a closure sealed around said tubes and sealing the top of said chamber; means communicating with said chamber for selectively varying the pressure therein between atmospheric and superatmospheric pressure; means for selectively introducing a gas into the second tube to force the liquid down in said tube; closely spaced electrodes in the upper end of the second tube to permit an electrical discharge through gas in the top of the second tube; and a calibrated scale in juxtaposition to said tubes to show the volume of gas introduced into the second tube, whereby a measured small quantity of one or more gases may be placed in the second tube and selectively removed therefrom, and variations in volume of the gaseous content of said second tube with variations in pressure may be observed.

2. Apparatus for demonstrating laws and principles of physics relating to fluids, comprising: a chamber partially filled with liquid; a first tube which has its lower end immersed in said liquid, said first tube having its upper end open to the ambient atmosphere; a second tube which has its lower end immersed in said liquid, said second tube having a closed upper end filled with gas; a closure sealed around said tubes and sealing the top of said chamber; means communicating with said chamber for selectively varying the pressure therein between atmospheric and superatmospheric pressure; means for selectively introducing a gas into the second tube to force the liquid down in said tube; a transparent jacket surmounting the chamber and encircling the second tube; means associated with the jacket to permit circulation of liquid around substantially the entire length of said second tube; means for determining the temperature of liquid in said jacket; and a calibrated scale in juxtaposition to said tubes to demonstrate the change in the volume of gas in said closed tube with changes in air pressure and temperature.

3. The apparatus of claim 2 in which the jacket encircles both tubes and is sealed to the top of the chamber, said apparatus further comprising a closure sealed in the upper end of the jacket through which the first tube projects, and nipples on the jacket adapted to be connected to a source of liquid.

4. Apparatus for demonstrating laws and principles of physics relating to fluids, comprising: a chamber partially filled with liquid; a first tube which has its lower end immersed in said liquid, said first tube having its upper end open to the ambient atmosphere; a second tube which has its lower end immersed in said liquid, the upper end of said second tube being a substantial distance below that of the first tube; means for selectively sealing the upper end of said second tube so that it may be completely filled with liquid by increasing the air pressure in the chamber and may then be sealed; a closure sealed around said tubes and sealing the top of said chamber; means communicating with said chamber for selectively varying the pressure therein between atmospheric and superatmospheric pressure; means for selectively introducing a gas into the second tube to force the liquid down in said tube; a transparent jacket surmounting the chamber and encircling the second tube; means associated with the jacket to permit circulation of liquid around substantially the entire length of said second tube; means for determining the temperature of liquid in said jacket; and a calibrated scale in juxtaposition to said tubes to show the volume of gas introduced into the second tube, whereby a measured small quantity of one or more gases may be placed in the second tube and selectively removed therefrom, and variations in volume of the gaseous content of said second tube with variations in pressure and temperature may be observed.

5. Apparatus for demonstrating laws and principles of physics relating to fluids, comprising: two independent chambers each of which is partially filled with liquid; a pair of independent first tubes, each of said first tubes having its lower end immersed in the liquid in one of said chambers and having its upper end open to the ambient atmosphere; two second tubes, each of said second tubes having its lower end immersed in the liquid in one of said chambers; closure means sealed around said first and second pairs of tubes and sealing the upper ends of said two chambers; a conduit interconnecting the upper ends of said second tubes; a pair of spaced gas ports through which gas may be selectively admitted to or removed from said conduit and said second tubes; selective sealing means for closing the conduit between said gas ports, so that two different gases may be separately admitted to said two second tubes and said gases may be mixed at will; separate means communicating with each chamber for selectively and independently varying the pressure in said chamber between atmospheric and superatmospheric pressure; and a calibrated scale in juxtaposition to each of said second tubes to show the volume of gas introduced into each second tube, whereby measured small quantities of the same or different gases may be selectively placed in each of said second tubes and selectively removed therefrom, and variations in volume of the gaseous content of each of said second tubes with variations in pressure may be observed.

6. The apparatus of claim 5 in which the interconnecting conduit is a Y tube, means is connected to the stem of the Y for selectively introducing liquid to the Y tube, each of the pair of gas ports is near the upper end of an arm of the Y tube, and each arm of the Y is provided with selective sealing means between the gas port and the stem of the Y.

7. The apparatus of claim 5 which includes a transparent jacket surmounting each of the pair of chambers and encircling the second tube, means associated with each jacket to permit circulation of liquid around substantially the entire length of said second tube, and means for measuring the temperature of said liquid in each jacket.

8. The apparatus of claim 7 in which each of the second tubes has a hook-like portion at its upper end which is inclined downwardly through the jacket and connects with an arm of the Y tube, outside the jacket, and in which each calibrated scale extends along the second tube to the point where said second tube passes through the jacket.

9. The apparatus of claim 5 which includes a transparent jacket surmounting each of the pair of chambers and encircling the second tube, means associated with each jacket to permit circulation of liquid around substantially the entire length of said second tube, and means for measuring the temperature of said liquid in each jacket.

10. The apparatus of claim 9 in which each of the second tubes has a hook-like portion at its upper end which is inclined downwardly through the jacket and connects with the interconnecting conduit outside the jacket, and in which each calibrated scale extends along the second tube to the point where said second tube passes through the jacket.

11. The apparatus of claim 5 which includes a transparent jacket surmounting each of the pair of chambers and encircling the second tube, means associated with each jacket to permit circulation of liquid around substantially the entire length of said second tube, means for controlling the circulation of liquid to maintain said jackets at different temperatures, and means for measuring the temperature of said liquid in each jacket.

12. Apparatus for demonstrating laws and principles of physics relating to fluids, comprising: a chamber partially filled with liquid; a first tube which has its lower end immersed in said liquid, said first tube having its upper end open to the ambient atmosphere; a second tube which has its lower end immersed in said liquid, said second tube having a closed upper end filled with gas; a closure sealed around said tubes and sealing the top of said chamber; means communicating with said chamber for selectively varying the pressure therein between atmospheric and super atmospheric pressure; a transparent jacket sealed to the top of the chamber and encircling the second tube, said jacket having nipples adapted to be connected to a source of liquid so that the latter may be circulated around substantially the entire length of said second tube; a closure sealed in the upper end of the jacket through which the first tube projects; means for determining the temperature of liquid in said jacket; and a calibrated scale in juxtaposition to said tubes to demonstrate change in the volume of gas in said closed tube with changes in air pressure and temperature.

13. Apparatus for demonstrating laws and principles of physics relating to fluids, comprising: a chamber partially filled with liquid; a first tube which has its lower end immersed in said liquid, said first tube having its upper end open to the ambient atmosphere; a second tube which has its lower end immersed in said liquid, the upper end of said second tube being a substantial distance below that of the first tube; means for selectively sealing the upper end of said second tube so that it may be completely filled with liquid by increasing the air pressure in the chamber and may then be sealed; a closure sealed around said tubes and sealing the top of said chamber; means communicating with said chamber for selectively varying the pressure therein between atmospheric and superatmospheric pressure; means for selectively introducing a gas into the second tube to force the liquid down in said tube; a secondary liquid source; means for selectively placing said secondary liquid source into communication with the upper end of the second tube; means for forcing liquid from said secondary source into the second tube; and a calibrated scale in juxtaposition to said tubes to show the volume of gas introduced into the second tube, whereby a measured small quantity of one or more gases may be placed in the second tube and selectively removed therefrom, and variations in volume of the gaseous content of said second tube with variations in pressure may be observed.

14. Apparatus for demonstrating laws and principles of physics relating to fluids, comprising: a chamber partially filled with liquid; a first tube which has its lower end immersed in said liquid, said first tube having its upper end open to the ambient atmosphere; a second tube which has its lower end immersed in said liquid; means for selectively closing the upper end of said second tube; a secondary liquid source; means for selectively placing said secondary liquid source into communication with the upper end of the second tube; means for forcing liquid from said secondary source into the second tube; a closure sealed around said tubes and sealing the top of said chamber; means communicating with said chamber for selectively varying the pressure therein between atmospheric and superatmospheric pressure; and a calibrated scale in juxtaposition to said tubes to demonstrate the change in the volume of gas in said closed tube with changes in pressure in said chamber.

15. The apparatus of claim 14 which also includes means for selectively introducing gas into the second tube.

16. Apparatus for demonstrating laws and principles of physics relating to fluids, comprising: transparent jacket means; first and second tubes in said jacket means; means for admitting gas into each of said tubes; means for selectively placing the upper ends of said tubes in communication with one another; means for selectively closing the upper end of each of said tubes; a fixed quantity of liquid, a portion of said liquid partially filling the lower end of each of said tubes to trap a volume of gas at the upper ends thereof when the upper ends are closed; means associated with said jacket means permitting circulation of liquid in said jacket means to raise and lower the temperature of the trapped gas, and to maintain the temperature of the trapped gas at a desired level; means for determining the temperature of liquid in said jacket means; means for selectively changing the level of liquid in each of said tubes in either direction at the will of an operator to vary the pressure on said trapped gas without adding to or diminishing the quantity of said liquid; and a calibrated scale in juxtaposition to said tubes to demonstrate the change in volume of said gas with changes in pressure and temperature.

17. The apparatus of claim 16 wherein said means for changing the level of liquid in each of said tubes comprises a flexible tube connected to the lower end of said first tube and a flexible tube connected to the lower end of said second tube, said flexible tubes each containing part of said supply of liquid, said flexible tubes being adapted to be selectively raised or lowered to change the level of liquid in said first and second tubes.

18. The apparatus of claim 16 which includes two independent supplies of liquid, there being one for partially filling the lower end of each of said tubes.

19. The apparatus of claim 18 which includes means for selectively connecting the two independent supplies of liquid.

20. The apparatus of claim 16 which includes means for selectively introducing a separate volume of liquid above the trapped gas in either or both of said tubes.

21. Apparatus for demonstrating laws and principles of physics relating to fluids, comprising: transparent jacket means; first and second tubes in said jacket means; means for admitting gas into each of said tubes; means for selectively connecting the upper ends of the tubes; means for selectively closing the upper end of each of said tubes; a fixed quantity of liquid, a portion of said liquid partially filling the lower end of each of said tubes to trap a volume of gas at the upper ends thereof when the upper ends are closed; means associated with said jacket means permitting circulation of liquid in said jacket means to raise and lower the temperature of the trapped gas, and to maintain the temperature of the trapped gas at a desired level; means for determining the temperature of liquid in said jacket means; means for selectively changing the level of liquid in each of said tubes in either direction at the will of an operator to vary the pressure on said trapped gas without adding to or diminishing the quantity of said liquid; a calibrated scale in juxtaposition to said tubes to demonstrate the change in volume of said gas with changes in pressure and temperature; and means for placing said first and second tubes in communication with one another.

22. Apparatus for demonstrating laws and principles of physics relating to fluids, comprising: transparent jacket means; first and second tubes in said jacket means; first connection means for placing the upper ends of said tubes in communication; second connection means for placing the lower ends of said first and second tubes in communication; three way valve means controlling said first and second connecting means; first and second gas supplies; means connecting said first and second gas supplies with said first and second tubes, respectively; three way valve means selectively closing the upper ends of said first and second tubes, and controlling the admission of gas into said tubes; a supply of liquid partially filling the lower end of each of said tubes; means for selectively changing the level of liquid in said tubes in either direction at the will of an operator, and including three way valve means for controlling the admission of liquid into said tubes; means associated with said jacket means permitting circulation of liquid in said jacket means for raising and lowering the temperatures of gases trapped in said tubes, and to maintain the temperature of a trapped gas at a desired level; means for determining the temperature of liquid in said jacket means; and a calibrated scale in juxtaposition with said tubes to demonstrate changes in the volume of said gas with changes in pressure and temperature.

23. Apparatus as defined in claim 22 wherein a water manometer is associated with the means connecting the gas supplies with the tubes for measuring the pressures of the gases.

24. Apparatus for demonstrating laws and principles of physics relating to fluids, comprising: transparent jacket means; first and second tubes in said jacket means; means for admitting gas into each of said tubes; means for selectively placing the upper ends of said tubes in communication with one another; means for selectively closing the upper end of each of said tubes; a supply of liquid partially filling the lower end of each of said tubes to trap a volume of gas at the upper ends thereof when the upper ends are closed; means associated with said jacket means permitting circulation of liquid in said jacket means to raise and lower the temperature of the trapped gas, and to maintain the temperature of the trapped gas at a desired level; means for determining the temperature of liquid in said jacket means; means for selectively changing the level of liquid in each of said tubes in either direction at the will of an operator to vary the pressure on said trapped gas; and a calibrated scale in juxtaposition to said tubes to demonstrate the change in volume of said gas with changes in pressure and temperature.

25. Apparatus as defined in claim 24 wherein means are provided in the upper end of each of said tubes for igniting combustible mixtures of gases therein.

References Cited by the Examiner

UNITED STATES PATENTS 1,917,846 7/1933 Klopsteg _____ 35—19

FOREIGN PATENTS 777,763 12/1934 France.
1,077,942 5/1954 France.

OTHER REFERENCES

Watson: "Text-Book of Physics," received scientific library March, 1942, published by Longmans, Green, and Co., pages 216, 217, 218, 221, 222, 223 relied on.

EUGENE R. CAPOZIO, *Primary Examiner*.

H. S. SKOGQUIST, *Assistant Examiner*.